(12) United States Patent
Page

(10) Patent No.: US 8,419,818 B2
(45) Date of Patent: Apr. 16, 2013

(54) PROTECTIVE DEVICE FOR AN AIR FILTER, IN PARTICULAR OF A GENERATING SET, COMPRISING PORTIONS TO ASSEMBLE RADIALLY ON THE FILTER

(75) Inventor: Emmanuel Page, Combrit (FR)

(73) Assignee: Cummins Filtration, Quimper (FR)

(*) Notice: Subject to any disclaimer, the term of this patent is extended or adjusted under 35 U.S.C. 154(b) by 647 days.

(21) Appl. No.: 12/523,027

(22) PCT Filed: Jan. 4, 2008

(86) PCT No.: PCT/EP2008/050054
§ 371 (c)(1),
(2), (4) Date: May 7, 2010

(87) PCT Pub. No.: WO2008/095737
PCT Pub. Date: Aug. 14, 2008

(65) Prior Publication Data
US 2010/0288662 A1   Nov. 18, 2010

(30) Foreign Application Priority Data
Jan. 18, 2007 (FR) ........................... 07 00328

(51) Int. Cl.
*B01D 39/02* (2006.01)
(52) U.S. Cl.
USPC .......... 55/503; 55/471; 55/480; 55/497; 55/498; 55/505; 210/232; 210/445; 210/449; 210/484; 210/485

(58) Field of Classification Search .......... 55/471, 55/493, 500–503, 357, 482, 497, 499, 521, 55/480, 498, 478; 210/232, 445, 484, 449, 210/485
See application file for complete search history.

(56) References Cited

U.S. PATENT DOCUMENTS 3,595,398 A * 7/1971 Cook ........................ 210/232
5,266,090 A   11/1993 Burnett

FOREIGN PATENT DOCUMENTS

WO   03099414 A1   12/2003

OTHER PUBLICATIONS

International Preliminary Report on Patentability from corresponding International Application No. PCT/EP2008/050054, filed Jan. 4, 2008.
International Search Report for corresponding International Application No. PCT/EP2008/050054, filed Apr. 1, 2008.

* cited by examiner

*Primary Examiner* — Jason M. Greene
*Assistant Examiner* — Karla Hawkins
(74) *Attorney, Agent, or Firm* — David D. Brush; Westman, Champlin & Kelly, P.A.

(57) ABSTRACT

A protective device is provided for an air filter that is substantially cylindrical and is intended to equip in particular a generating set. The filter is intended to be press fitted to a duct of said set. The protective device includes at least two portions that are securable radially on the filter in order to form a protective case surrounding the filter.

16 Claims, 2 Drawing Sheets

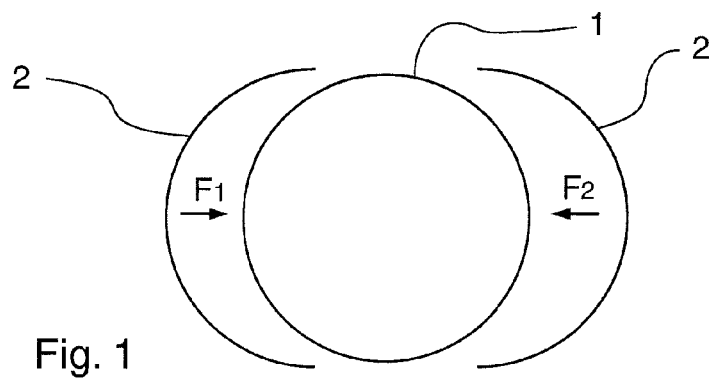
Fig. 1
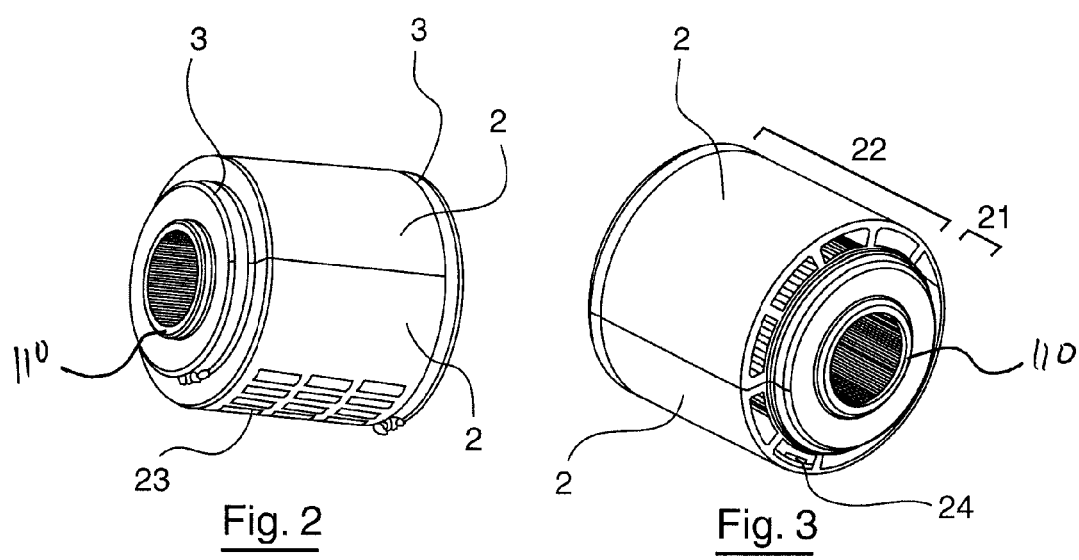
Fig. 2  Fig. 3
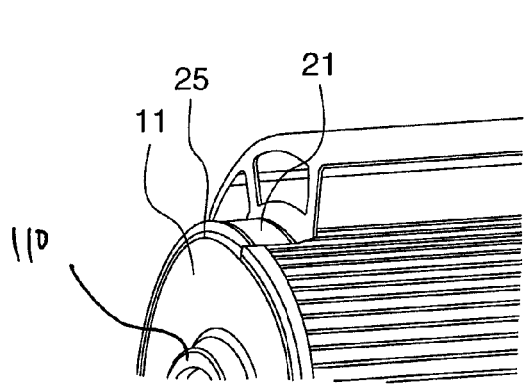 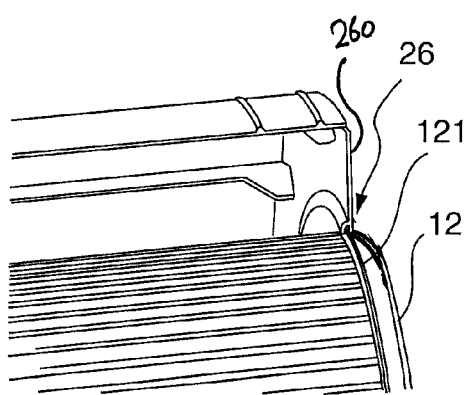
Fig. 4  Fig. 5

PROTECTIVE DEVICE FOR AN AIR FILTER, IN PARTICULAR OF A GENERATING SET, COMPRISING PORTIONS TO ASSEMBLE RADIALLY ON THE FILTER

CROSS-REFERENCE TO RELATED APPLICATIONS

This Application is a Section 371 National Stage Application of International Application No. PCT/EP2008/050054, filed Jan. 4, 2008 and published as WO 2008/095737 on Aug. 14, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to the field of designing and realising equipment and accessories for air filtration. More precisely, the disclosure relates to the protection of air filters, in particular for high-capacity filters such as those mounted on high-power generating sets.

The disclosure applies in particular to generating sets, but can also be applied to other types of equipment requiring a filtered air intake such as marine engines, industrial engines, etc.

BACKGROUND OF THE DISCLOSURE

The generating sets implement combustion engines supplied by an air/fuel mixture, with the air being taken by the intake duct of a turbocharger. This intake duct is provided with an air filter.

In the category of high-power generating sets, the following in particular can be distinguished:
- the sets referred to as "heavy-duty", which are used continuously, generally outdoors, likely to be used in dusty and/or wet environments;
- the sets referred to as "stand-by", which are by default on standby, and triggered in the event of an emergency; these sets are conventionally used in hospital environments and are stored in technical premises.

The air filters of the "heavy duty" sets require to be protected from their environment.

For this, the set generally has a case intended to receive the air filter.

In reference to FIG. 8, the mounting of such a filter implies a succession of operations rendering the mounting time relatively high.

The case such as shown in FIG. 8 comprises in particular a cover 81 which, once removed, makes it possible to extract or install a filter.

Note that this technique involves the inserting of the filter in the case according to the longitudinal axis of the latter.

Yet, a case conventionally has a length of 70 cm, with this length being approximately that of the filter. It is therefore necessary to have a space that is twice the length L: once for the encumbrance of the case, and once for the presentation of the filter in front the case during the installation of the filter in the case.

In certain cases, this operation is rendered tedious and even impossible, due to the presence of obstacles (such as equipment and/or portions of structures) in the immediate vicinity of the generating set.

Another technique has been proposed by prior art, according to which the case is moulded on the plates of the filter, formant with the latter a one-piece unit.

The mounting of the case/filter unit is considerably simplified, the outlet duct of the filter being intended to be press fitted directly to the duct of the compressor of the set.

However, the disadvantage of this technique is that the case and the filter cannot be separated. Consequently, each filter change tends to generate a quantity of waste that is greater than the replacing of the filter alone.

In addition, the one-piece case/filter unit is a relatively expensive part.

According to yet another technique proposed by prior art, the filter is mounted in a case constituted of two portions articulated in relation to one another. According to this technique, the filter is installed in one of the portions of the case, with the other portion folded down on the first in order to close the case. A ring equipped with ramps present at the bottom of the case is then actuated in order to cause a longitudinal locking of the filter in the case and bring the seal of the upper plate of the filter into compressed position against the case. Note that the locking and the sealing of the filter in the case are as such obtained using a specific part, which tends to increase the complexity of the unit as well as its cost of manufacture.

Moreover, the case has a sleeve intended to be press fitted to the equipment. It is therefore understood that the case exerts a support function of the filter on the equipment, as the filter is not mechanically in cooperation with the air intake of the equipment.

A consequence is that according to this technique, it is not provided to mount the filter without the case (the latter forming a means of linking between the filter and the equipment).

In parallel, for the "standby" sets, it is conventional to implement the free air filters, i.e. without case.

The filter is press fitted to the duct of the compressor of the set and, where applicable, a square removably attached to the frame of the set maintains the filter at its end opposite the press fitting by exerting a bearing on the rear plate of the filter.

The mounting of the filter according to this technique is particularly simple and rapid.

However, this technique is not adapted to exterior applications or to very dusty environments, as no protection of the filter is provided.

Yet, the manufacturers of generating sets want to propose or have modular solutions, combining the simplicity of mounting of the filter according to the "standby" technique with the possibility of protecting the filter in the event of exterior use.

SUMMARY

An aspect of the present disclosure relates to a protective device for a substantially cylindrical air filter intended to equip in particular a generating set, said filter comprising an air duct intended to cooperate with an air intake duct of said set in such a way as to ensure the maintaining of said filter on said set, wherein the device comprises at least two portions intended to be secured radially on said filter in order to form a protective case surrounding said filter.

As such, thanks to an embodiment of the invention, it is possible to propose energy producing equipment (or others) including an air intake according to an unprotected configuration of the air filter, while retaining the possibility of switching to a protected configuration of the filter.

Indeed, in the case of generating sets, the offer of manufacturers and/or distributors of equipment can include a basic configuration corresponding to "standby" sets, with as an option the protective device according to an embodiment of the invention.

It is understood that economic advantages can as such be obtained.

These economic advantages are combined with the fact that a protective device according to an embodiment of the invention can be realized at less cost compared to the solutions of prior art, the latter entailing simple and rapid operations of mounting (compared to the operations of mounting protective cases for filters of "heavy duty" sets mentioned hereinabove.

Moreover, the "radial" mounting of a protective device according to an embodiment of the invention allows for a mounting in congested environments. Indeed, contrary to the solutions of prior art according to which it is necessary to have a minimum space in front of the case in order to longitudinally insert therein the filters (the latter able to reach lengths of 70 cm and more, which implies a space of at least equivalent length in front of the opening of the case in order to be able to present the filter), the fact of being able to radially bring the protective device in relation to the filter (which may already be in place) overcomes the considerations concerning available space.

According to a preferred solution, at least one of said portions has means for locking and/or positioning intended to cooperate with the corresponding forms of said filter.

The case formed by the portions can as such be maintained reliably on the filter.

Furthermore, such means contribute in facilitating the setting up of the portions of the case on the filter in order to install it.

In this case, said means for locking and/or positioning include advantageously longitudinal means for maintaining intended to cooperate with at least one of the ends of said filter.

According to an advantageous solution, said portion or portions have at one of their ends an edge extending radially and intended to form a longitudinal contact on a plate of said filter.

Preferentially, said or said portions also present at one of their ends a groove forming a housing for a flange of said filter.

Simple and effective means are thus obtained to lock longitudinally the case onto the filter, this by taking advantage of certain existing forms of conventional air filters.

Advantageously, at least one of said portions has at least one air intake window.

According to a first alternative, said or said windows are arranged in such a way as to allow for a radial intake.

According to a second alternative, said or said windows are arranged in such a way as to allow for a longitudinal intake.

According to another advantageous characteristic, the device comprises removable means for attaching of said portions one in relation to one another.

According to a first embodiment of means for attaching, the latter include at least one clamping collar.

According to a second embodiment of means for attaching, the latter are carried by said portions and are preferentially means for lock fitting of said portions between one another.

According to another advantageous characteristic, said portions are identical in relation to one another.

The portions can as such be manufactured at low cost, in particular by moulding of a plastic material.

BRIEF DESCRIPTION OF THE DRAWINGS

Other characteristics and advantages shall appear more clearly when reading the following description of an embodiment of the invention and of a few of its alternatives, given by way of informational and non-limiting examples, and of the annexed drawings wherein:

FIG. 1 is a schematic representation of the general principle of an embodiment of the invention;

FIG. 2 is a perspective view of a device according to an embodiment of the invention, mounted on an air filter, according to a first alternative;

FIG. 3 is a perspective view of a device according to an embodiment of the invention, mounted on an air filter, according to a second alternative;

FIG. 4 is a detailed view of an end of a portion of a device according to an embodiment of the invention;

FIG. 5 is a detailed view of another end of a portion of a device according to an embodiment of the invention;

DETAILED DESCRIPTION OF ILLUSTRATIVE EMBODIMENTS

Figure 6:
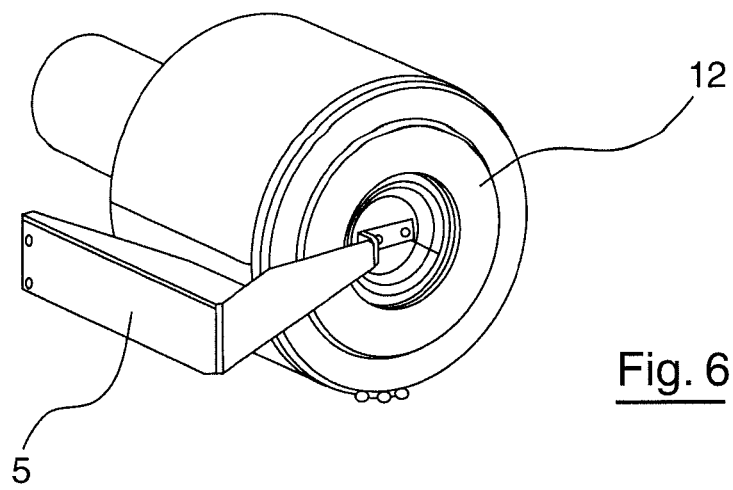
FIGS. 6 and 7 are perspective views, at two different angles, of a mode of mounting of a device according to an embodiment of the invention.
Figure 7:
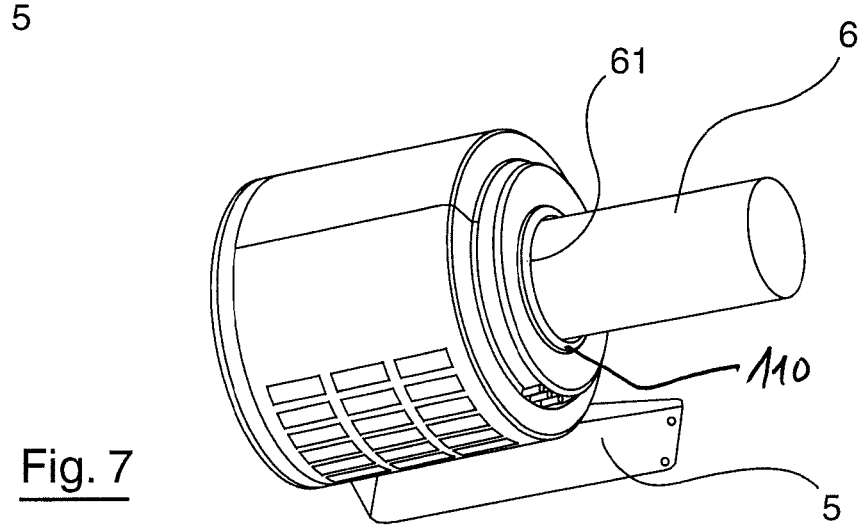
Figure 8:
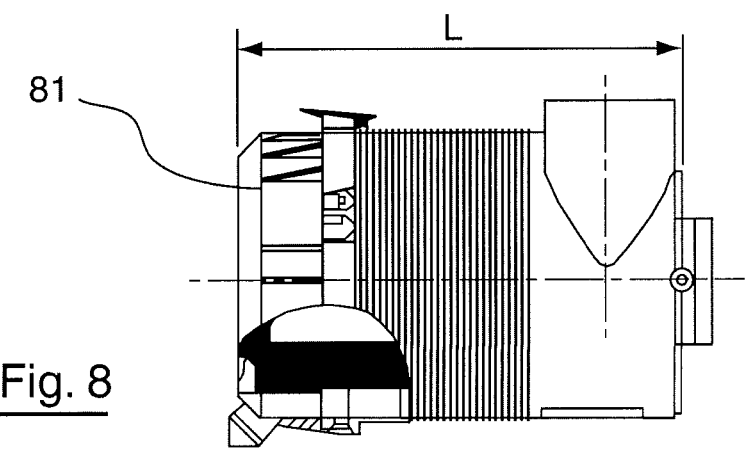
FIG. 8 is a view of the mounting of an air filter in a case according to prior art.

As mentioned hereinabove, the principle of an embodiment of the invention resides in the fact of designing a protective case of an air filter in the form of portions to secure according to a radial direction in relation to the filter.

This is shown schematically in FIG. 1, which shows a filter 1 (having conventionally a general cylindrical form forming a section, according to the view in FIG. 1, a circular section) in relation to which a protective device according to an embodiment of the invention comprised of portions 2 is shown.

Such as is shown clearly, the portions 2 (here in the number of two but which may be of a higher number) are intended to be mounted on the filter by securing them according to the directions indicated by the arrows F1 and F2, i.e. according to radial directions in relation to the filter.

The number, the form and the dimensions of the portions are defined in such a way that, once mounted on the filter, they fully surround the filter aiming to form together a case such as is shown in FIG. 2 or 3.

Note that the portions of the case are mechanically independent in relation to one another before their assembly on the filter. As such, the possibility is preserved of manufacturing parts that are of simple design and inexpensive (in opposition to parts connected to one another by a hinge for example).

In reference to FIGS. 2 and 3, the portions 2 once assembled form a case of which a first portion 21 has a diameter substantially equal to the exterior diameter of the filter and a second portion 22 has a diameter greater than that of the portion 21, an air circulation space being arranged between the portion 22 and the air filter.

Also note that the portions 2 are preferentially identical one in relation to the other in such a way as to be able to be manufactured in series with a single tool, for example by moulding of plastic material.

However, it can be considered that the portions 2 be separate, with only one of them having air intake windows 23 according to a radial direction (FIG. 2).

The case where only one of the portions 2 has such windows 23 can be recommended in the case of a use of the filter in a relatively dusty environment, with the windows then being oriented towards the floor. It can however be considered that, in certain conditions of use, the two portions 2 have such radial air intake windows 23.

According to an alternative that can be considered, the portions 2 (or at least one of them) have air intake windows 24 according to a longitudinal direction (FIG. 3).

These windows 24 are then advantageously arranged in the shoulder connecting the portions 21 and 22 mentioned hereinabove.

According to another advantageous characteristic of an embodiment of the invention, the portions 2 (or at least one of them) have means for positioning and/or locking intended to cooperate with the filter.

Preferentially, these means are provided in order to ensure the positioning and the maintaining in position on the filter of the portions 2 according to the longitudinal direction as well as according to a radial direction of the filter.

For this, in reference to FIGS. 4 and 5, the portions 2 have:
- at one of their ends, an edge 25, extending the portion 21 and extending radially in such a way as to create a longitudinal bearing annular surface intended to be thrust against the front plate 11 of the air filter;
- at the other of their ends, a groove 26 intended to receive a flange 121 that the rear plate 12 of the air filter has.

Note that the edge 25 extends in a first plane, that the groove 26 extends in a second plane corresponding to the bottom 260 and that these first and second planes constitute end planes of the portions 2.

The edge 25 in particular lies as such in a terminal plane of the portions 2.

In other words, the portions 2 do not extend longitudinally beyond the edge 25 and, in any case, do not have, beyond the edge 25, means for mechanical cooperation with the air intake duct of the equipment whereon the filter is secured.

In reference to FIG. 4, the edges 25 of the portions 2 constitute together a bearing annular zone on the upper plate 11 of the filter.

In addition, this bearing annular zone extends radially in such a way as to arrange a recess of a diameter sufficient to form a passage for a sleeve 110 attached to the upper plate 11 of the filter and extending from this upper plate.

The mounting of the portions 2 constituted as such on the filter is carried out simply, this by engaging the groove 26 of one end of the portions on the flange 121 of the filter. The length of the portions 2 is of course provided in such a way that, by engaging the groove 26 on the flange 121, the edge 25 comes into contact on the plate 11.

Note that the groove 26 contributes in maintaining the portions 2 on the filter and constitutes in addition a means for forming a sealed link between the portions 2 and the filter (a seal can be secured inside the groove aiming in particular to absorb any vibrations).

The portions 2 are then attached one in relation to the other using removable means in such a way that the portions 2 can be easily separated from the filter when the latter is renewed.

For this, according to a first embodiment, clamping collars 3 are secured around the portions 2, one on the portions 21 and the other on the portion 22 in the vicinity of the plate 12.

According to another embodiment, the means for attaching are incorporated into the portions and are constituted by means for lock fitting (not shown) of the portions 2 between themselves.

In reference to FIGS. 5 and 6, the filter is mounted on the equipment (prior or not prior to the installation of the portions 2) by being press fitted to a duct 6 (for example that of a compressor of a generating set).

More precisely, the sleeve 110 of the filter (this sleeve extending from the upper plate as indicated hereinabove) is press fitted with the air intake duct 6 of the equipment whereon is secured the filter. A radial seal 61 is comprised by the internal wall of the sleeve 110 of the filter, providing a sealing between the sleeve and the duct 6, this seal being a part of the plate of the filter and being moulded in the same flexible material as the plate.

Additional means of maintaining of the filter can be provided, for example by securing a square 5 fixed by one of its ends to the frame of the equipment whereon is mounted the filter and by the other of its ends to the rear plate 12 of the filter.

Once the filter mounted on the duct 6, the protective device can be removed without having to remove the filter from the duct.

Inversely, the protective device can be secured on the filter even if the latter is already mounted on the duct.

It is therefore possible to switch from an unprotected configuration of the filter to a protected configuration without intervening on the mounting of the filter on the air intake duct.

It is therefore understood that it is indeed the filter which is mounted on the equipment and which supports the protective device, not the inverse (i.e. the protective device mounted on the duct, the filter being mounted and maintained inside of the protective device).

An embodiment of the present disclosure provides a technique for mounting an air filter, for example that of a generating set, that makes it possible to switch easily from a protected configuration to an unprotected configuration of the filter.

An embodiment of the present disclosure provides such a technique that is practical to use.

An embodiment of the present disclosure provides such a technique that overcomes any constraints in terms of reduced space around the equipment whereon the filter is to be mounted.

An embodiment of the present disclosure provides such a technique that does not produce excess waste during the renewal of filters.

An embodiment of the present disclosure provides such a technique that is simple in design, easy to implement and inexpensive to realize.

Although the present disclosure has been described with reference to one or more examples, workers skilled in the art will recognize that changes may be made in form and detail without departing from the scope of the disclosure and/or the appended claims.

The invention claimed is:

1. A protective device for an air filter,
    wherein said air filter is substantially cylindrical and is intended to equip in particular a generating set, said air filter being configured to be press fitted to a duct of said set,
    wherein said protective device comprises:
    at least two portions configured to be secured radially on said air filter in order to form a protective case surrounding said air filter while permitting the protective device to be removed from the air filter without removing the air filter from the duct.

2. The protective device for an air filter according to claim 1, wherein at least one of said portions has means for locking and/or positioning, which cooperate with corresponding forms of said air filter.

3. The protective device for an air filter according to claim 2, wherein said means for locking and/or positioning comprise longitudinal means for maintaining, which cooperate with at least one end of said air filter.

4. The protective device for an air filter according to claim 2, wherein said portion(s) have at one of their ends an edge extending radially and forming a longitudinal contact on a plate of said air filter.

5. The protective device for an air filter according to claim 2, wherein said portion(s) have at one of their ends a radially-extending groove forming a housing for receiving an annular, radially-extending flange of said air filter.

6. The protective device for an air filter according to claim 1, wherein at least one of said portions has at least one air intake window.

7. The protective device for an air filter according to claim 6, wherein said window(s) are arranged in such a way as to allow for a radial intake.

8. The protective device for an air filter according to claim 6, wherein said window(s) are arranged in such a way as to allow for a longitudinal intake.

9. The protective device for an air filter according to claim 1, further comprising means for removably attaching said portions in relation to one another.

10. The protective device for an air filter according to claim 9, wherein said means for attaching comprise at least one clamping collar.

11. The protective device for an air filter according to claim 9, wherein said means for attaching are carried by said portions.

12. The protective device for an air filter according to claim 11, wherein said means for attaching comprise means for lock fitting of said portions between themselves.

13. The protective device for an air filter according to claim 1, wherein said portions are identical between themselves.

14. The protective device for an air filter according to claim 1, wherein the at least two portions are configured to arrange a passage for a sleeve attached to an upper plate of the air filter, the sleeve extending from said upper plate to be press fitted to the duct of the generating set, the duct being an air intake duct.

15. The protective device for an air filter according to claim 14, wherein the at least two portions have an edge at one of their ends, and
wherein the edges of at least the two portions constitute together a bearing annular zone on an upper plate of the air filter and arrange the passage for the sleeve.

16. A protective device for an air filter,
wherein said air filter is substantially cylindrical and is intended to equip in particular a generating set, said air filter being configured to be press fitted to an air intake duct of said set, and
wherein said protective device comprises:
at least two portions configured to be secured radially on said air filter in order to form a protective case surrounding said air filter, said protective case being configured to be removable from the air filter without removing the air filter from the duct, wherein the at least two portions form a passage for a sleeve attached to an upper plate of the air filter, the sleeve extending from said upper plate to be press fitted to the air intake duct of the generating set.

* * * * *